United States Patent [19]

Voisine

[11] Patent Number: 4,613,353
[45] Date of Patent: Sep. 23, 1986

[54] CONVOLUTED SHAFT ACTUATOR LINK FOR GLASSWARE FORMING MACHINE

[75] Inventor: Gary R. Voisine, Hartford, Conn.

[73] Assignee: Emhart Industries, Inc., Farmington, Conn.

[21] Appl. No.: 724,364

[22] Filed: Apr. 17, 1985

[51] Int. Cl.$^4$ ............................................. C03B 9/40
[52] U.S. Cl. ......................................... 65/163; 65/160; 65/241; 74/89.14; 74/89.15; 92/2; 92/17; 92/31
[58] Field of Search ......... 65/160, 241, 163, DIG. 13; 74/89.14, 89.15; 92/2, 17, 31

[56] References Cited

U.S. PATENT DOCUMENTS

| | | | |
|---|---|---|---|
| 2,728,556 | 12/1955 | House | 74/89.15 |
| 3,546,957 | 12/1970 | Adams | 74/89.14 |
| 3,605,569 | 9/1971 | Sessody | 74/89.14 |
| 4,203,752 | 5/1980 | Becker | 65/163 |
| 4,313,750 | 2/1982 | Lulejian et al. | 65/163 |
| 4,351,663 | 9/1982 | Wood | 65/160 |
| 4,409,013 | 10/1983 | Cardenas et al. | 65/160 |
| 4,557,746 | 12/1985 | Braithwaite et al. | 65/163 |

Primary Examiner—Arthur Kellogg
Attorney, Agent, or Firm—H. Samuel Kieser

[57] ABSTRACT

An actuator for use in or with a glassware forming machine for driving a member through an arcuate path, such member being a pusher cylinder for moving glassware articles. The pusher member comprises a linearly movable piston for linearly moving a convoluted shaft attached thereto. The convoluted shaft has three surfaces thereon which act as tracks for three roller bearings mounted on a hub which is disposed about the shaft. Linear motion of the shaft is converted into rotary motion in the hub by the action of the bearings running on the convoluted sides of the linearly moving shaft.

7 Claims, 4 Drawing Figures

CONVOLUTED SHAFT ACTUATOR LINK FOR GLASSWARE FORMING MACHINE

BACKGROUND OF THE INVENTION

1. Field of the Invention

The invention relates generally to actuating mechanisms for moving various components of a glassware forming machine through their respective operating cycles. More specifically, the invention relates to the components of pusher mechanisms which move glassware containers through a predetermined arcuate path from a dead plate on to a moving conveyor.

2. Description of the Prior Art

Pusher mechanisms for moving glassware articles from a dead plate to a moving conveyor are well known in the prior art. These devices generally include a pneumatic pusher cylinder or head and a rotary actuator means for moving it through a predetermined arcuate path. In operation, each pusher cylinder piston is in a retracted position prior to the deposition of one or more glassware articles on a corresponding dead plate. Extension of the piston rod end by conventional pneumatic means positions fingers at the end of the piston rod near the glassware articles. Movement of the pusher cylinder through an arcuate path is an operating stroke which causes the fingers to contact the ware and move it outwardly through an angle of approximately 90° onto a moving conveyor belt. The piston rod is then retracted and the pusher cylinder returned inwardly on a return stroke in the opposite arcuate direction to complete the cycle.

The arcuate outward velocity of the pusher cylinder is important since it must be slow enough at the start of the cycle so as not to make unstable or break the glassware upon contact with the fingers and subsequently fast enough to match the arcuate glassware velocity to the conveyor velocity.

Electronic pusher mechanisms have been produced where each pusher mechanism may be driven independently of the others according to a predetermined velocity profile by an electric motor controlled by a common control means. In some such prior art units several velocity profiles may be stored in memory and recalled at will. Examples of such prior art electronic pushers are shown in U.S. Pat. Nos. 4,203,752 and 4,313,750.

Each of these prior art electronic pushers requires a relatively large electric motor in driving connection with the pusher cylinder in order to control its arcuate movement in both directions (both inward and outward arcuate strokes). Because the pusher cylinder is a relatively massive component, these electric motors are necessarily large and require high torque, thus, making these prior art electric pusher mechanisms costly and inefficient. Moreover, the return stroke of the pusher cylinder in such prior art electric pushers is constrained by the ability of the electric motor to move the relatively massive cylinder head.

Further prior art is shown in U.S. patent application Ser. No. 520,396 filed Aug. 4, 1983, wherein an actuator has a pneumatic cylinder which is used to linearly advance a splined shaft, which in combination with a splined hub, converts that linear advance to rotary motion. The rotary motion then swings the pusher cylinder through its arcuate path. This splined shaft with its associated splined hub is relatively expensive to fabricate. Furthermore, a backlash may be produced between the hub and the splined shaft when wear occurs, which can contribute to mismovement or inaccurate placement of glassware during operation thereof.

It is an object of this invention, to overcome the disadvantages of the prior art.

It is a further object of the present invention, to provide a motion transmitting mechanism, which converts linear motion to rotary motion, without the drawbacks of the prior art.

BRIEF SUMMARY OF THE INVENTION

The present invention comprises pusher mechanism utilizable with a glassware forming machine for driving a member through a predetermined path. The pusher mechanism has a helically twisted shaft in combination with a bearing hub to convert linear motion into arcuate motion, while avoiding the expense and inefficiencies associated with the prior art. The helical shaft is of generally triangular cross-section, the flat sides of which comprise the convoluted path for an arrangement of roller bearings mounted in the hub. As the shaft is displaced alongs its linear axis, the roller bearings on the hub are caused to rotate because the bearings are in rolling engagement with the convoluted sides of the shaft, thus inputing the rotary motion to a pusher cylinder on the top of the pusher mechanism.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
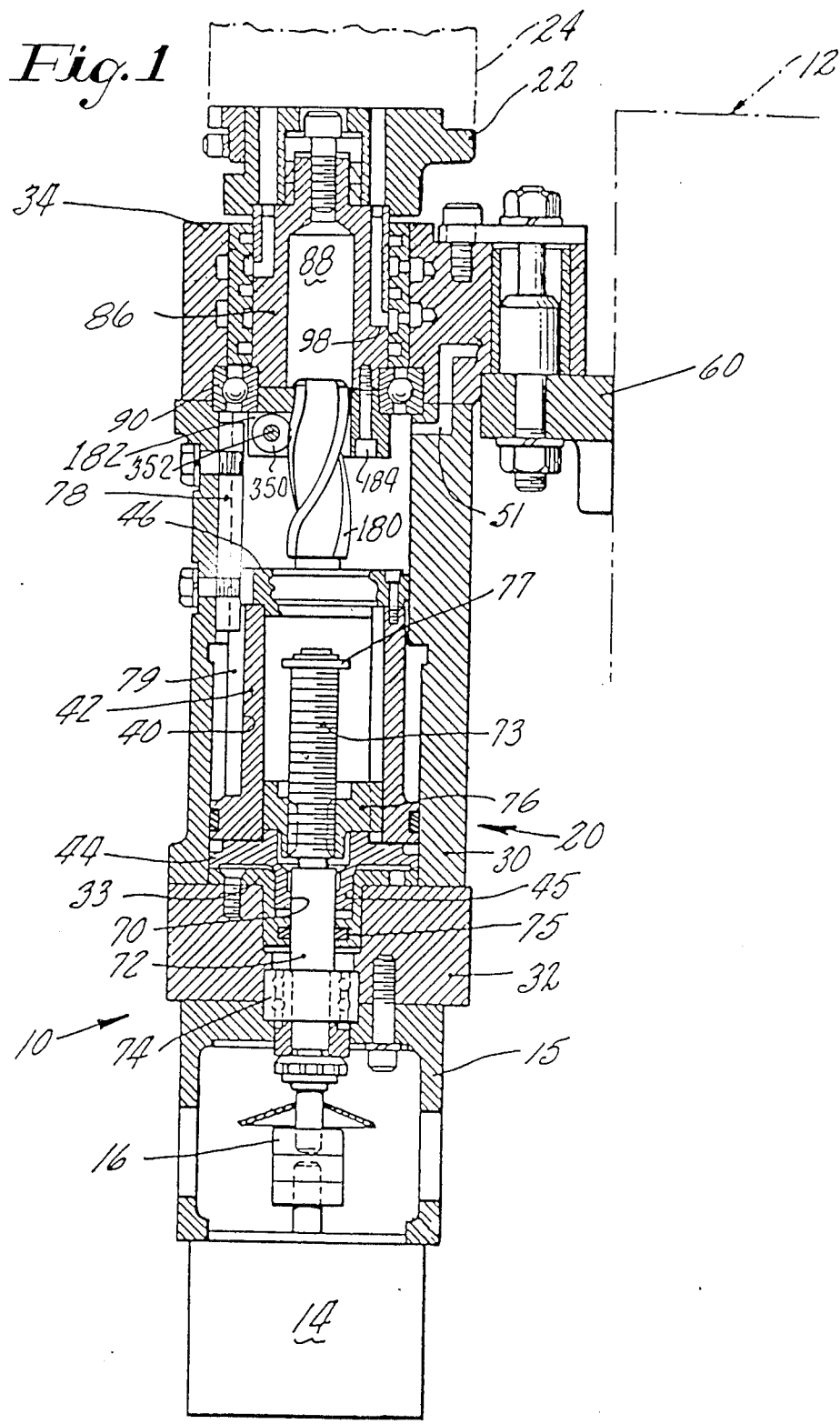
FIG. 1 is a side-elevational view, partly in cross-section, showing an electro-pneumatic drive mechanism constructed according to the principles of the present invention.

Referring now to the drawings in detail and particularly to FIG. 1 there is shown a side elevational view, in cross-section, of an electro-pneumatic pusher mechanism 10 mounted adjacent a conveyor 12, similar to that shown in U.S. patent application Ser. No. 520,396, incorporated herein by reference. The pusher mechanism 10 basically comprises a motor 14, a piston and cylinder assembly 20, a turntable 22 and a pusher cylinder 24 (shown partially cut away).

The piston and cylinder assembly 20 comprises a cylinder wall 30, a pair of lower and upper cylinder caps 32 and 34, respectively, and a piston 40 which further comprises a piston body 42, and a pair of lower and upper piston caps 44 and 46, respectively. The piston 40 is pneumatically driven longitudinally within assembly 20 by conventional means. An air line (not shown) allows the communication of pushout air to the bottom surface of the lower piston cap 44 while another air line 51 provides return air to top surface of the upper piston cap 46. All air lines within the pusher 10 are fed from a manifold within a mounting bracket 60 best explained below with reference to the aforementioned incorporated application.

While the driving force for the piston 40 is pneumatic, its longitudinal (linear) velocity is controlled electrically in one direction by the motor 14. The motor 14 may be, for example, a digital stepping motor under the control of a microprocessor or other control circuit (not shown). Alternatively, the motor 14 may be a linear actuator or their suitable means which may be controlled to effect the operation described herein.

The piston 40 is hollow and its lower cap 44 is provided with an axial aperture 70 to permit a shaft 72 to extend into the hollow piston. The shaft 72 has a threaded end 73 and extends through the lower cylinder cap 32 and the motor mounting bracket 15. The shaft 72 is connected by a coupling 16 to the output shaft of the motor 14. Appropriate sealed bearings 74 and an arrangement of shaft seals 75 serve to enable sealed rotation of the shaft 72 within the piston and cylinder assembly 20. The threaded control nut 76 is threadably engaged with the shaft end 73 and is prevented from rotating therewith, thus constraining it to move only longitudinally in response to rotation of the shaft 72. Similarly, rotation of the piston 40 is prevented by a key 78 cooperating with a recess 79.

A restraining washer 77 is secured by a retaining clip to the end of the shaft 72 to limit motion of the nut 76.

The lower piston cap 44 is provided with a tapered extension 45 which mates with a complementary bronze insert 33 secured to the cylinder end cap 32. The insert 33 provides a pneumatic cushion and facilitates alignment and seal retention.

The upper piston cap 46 has welded or otherwise secured to it a shaft 180 of triangular configuration which is in operative engagement with a bearing hub 182 rotatably mounted within the upper cylinder cap 34. The bearing hub 182 is secured by an arrangement of bolts 184 to a shaft cap 86 which is provided with a recess 88 to receive the shaft 180 upon extension of the piston 40. A bearing 90 permits rotation of the bearing hub 182 and the shaft 86 relative to the cylinder cap 34.

Figure 3:
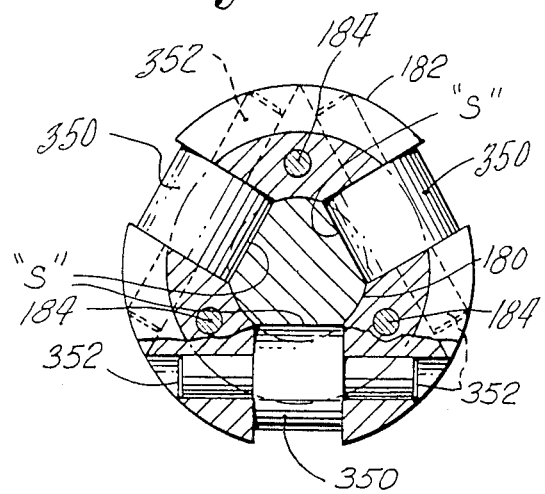
FIG. 3 is a view taken along the lines III—III of FIG. 2.
Figure 2:
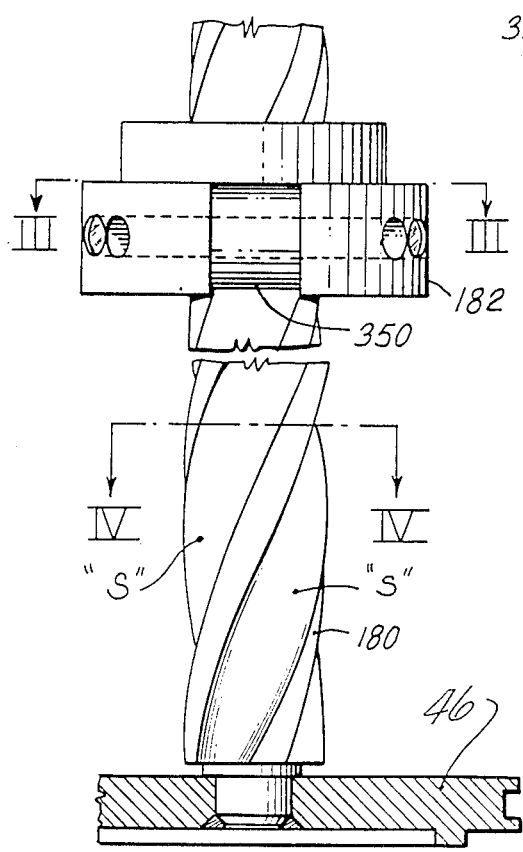
FIG. 2 is an enlarged view of a portion of FIG. 1, showing the helical shaft and its hub in more detail.
Figure 4:
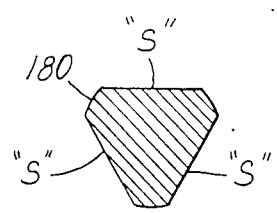
FIG. 4 is a view taken along the lines IV—IV of FIG. 2.

The shaft 180 is shown in more detail in FIGS. 2, 3 and 4. The shaft 180 as shown in cross-section in FIG. 4, is generally of triangular configuration, having an arrangement of flat sides "S". The shaft 180 is convoluted so that each flat side "S" is configured into a helically oriented surface. The bearing hub 182, shown in FIGS. 2 and 3, has an arrangement of roller bearings 350 each mounted on a pin 352 and mounted in rolling relation to the hub 182. Each roller bearing 350 is arranged to roll on its respective helically configured side "S" of the shaft 180. The rolling relationship between the roller bearings 350 and the convoluted or twisted sides "S" of the axial advancing shaft 180 provides the conversion to rotary motion for the upper cylinder cap 34, from the linear motion of the advancing shaft 180 and the linear motion of the piston 40, ultimately providing the horizontal arcuate motion of the turnable 22 on top of the pusher mechanism 10. The rolling movement of the bearings 350 over the sides "S" reduces the friction generating during the sliding movement associated with the prior art.

Thus there has been shown a unique motion conversion mechanism for an actuating glass containers through an arcuate path, improving the operation of the machine, while reducing its cost.

I claim:

1. An apparatus for cyclically moving a member along a predetermined arcuate path comprising:
   a cylinder;
   a piston movable within said cylinder;
   a motor;
   a threaded shaft for being rotated by said motor;
   a control nut in threaded engagement with said threaded shaft for being longitudinally moved by the rotation thereof;
   means enabling contiguous engagement of said control nut with said piston during motion thereof in a predetermined direction;
   a convoluted shaft secured to said piston for linear motion therewith; and
   a rotatable hub having roller bearings in engagement with said convoluted shaft for imputation of rotational motion thereto.

2. An apparatus for cyclically moving a member along a predetermined path, as recited in claim 1, wherein said convoluted shaft is of generally triangular configuration in axial cross-section thereof.

3. An apparatus for cyclically moving a member along a predetermined path as recited in claim 1, wherein said convoluted shaft has three twisted surfaces thereon which said roller bearings react.

4. An apparatus for cyclically moving a member along a predetermined path as recited in claim 1, wherein said apparatus comprises a pusher member for a glassware forming machine.

5. An apparatus for arcuately moving a pusher cylinder of a glassware making machine along a predetermined arcuate path to move at least one article from a dead plate onto a moving conveyor comprising:
   a cylinder;
   a piston movable within said cylinder;
   a motor;
   a threaded shaft for being rotated by said motor;
   a control nut in threaded engagement with said threaded shaft for being longitudinally moved by the rotation thereof;
   means enabling contiguous engagement of said control nut with said piston during motion thereof in a predetermined direction;
   a convoluted shaft secured to said piston for linear motion therewith;
   a rotatable hub having roller bearings in engagement with said convoluted shaft for imputation of rotational motion thereto; and
   a mounting plate secured to said hub, said mounting plate adapted to support said pusher cylinder.

6. An apparatus for arcuately moving a pusher cylinder as recited in claim 5, wherein said convoluted shaft is of generally triangular configuration in axial cross-section thereof.

7. An apparatus for arcuately moving a pusher cylinder as recited in claim 5, wherein said convoluted shaft has three twisted surfaces thereon with which said roller bearings react.

* * * * *